United States Patent
Ahmed et al.

(10) Patent No.: US 10,757,472 B2
(45) Date of Patent: Aug. 25, 2020

(54) ENHANCING VIDEO CONTENT ACCORDING TO METADATA

(71) Applicant: INTERDIGITAL MADISON PATENT HOLDINGS, SAS, Paris (FR)

(72) Inventors: Samir Ahmed, Culver City, CA (US); Christophe Louvion, Los Angeles, CA (US)

(73) Assignee: INTERDIGITAL MADISON PATENT HOLDINGS, SAS, Paris (FR)

( * ) Notice: Subject to any disclaimer, the term of this patent is extended or adjusted under 35 U.S.C. 154(b) by 0 days.

(21) Appl. No.: 15/324,166

(22) PCT Filed: Apr. 30, 2015

(86) PCT No.: PCT/US2015/028594
§ 371 (c)(1),
(2) Date: Jan. 5, 2017

(87) PCT Pub. No.: WO2016/007210
PCT Pub. Date: Jan. 14, 2016

(65) Prior Publication Data
US 2017/0201794 A1 Jul. 13, 2017

Related U.S. Application Data
(60) Provisional application No. 62/021,685, filed on Jul. 7, 2014.

(51) Int. Cl.
*H04N 7/173* (2011.01)
*H04N 21/44* (2011.01)
(Continued)

(52) U.S. Cl.
CPC ... *H04N 21/44012* (2013.01); *H04N 21/2343* (2013.01); *H04N 21/2353* (2013.01);
(Continued)

(58) Field of Classification Search
CPC ............... H04N 21/235; H04N 21/435; H04N 21/4622; H04N 21/84
(Continued)

(56) References Cited

U.S. PATENT DOCUMENTS 6,092,089 A * 7/2000 Lahey ................. G06F 17/2229
715/251
6,466,624 B1 10/2002 Fogg
(Continued)

FOREIGN PATENT DOCUMENTS

WO WO2009095732 8/2009
WO WO2011103258 8/2011

OTHER PUBLICATIONS

Hunter et al., "A comparison of schemas for video metadata representation," Computer Networks, vol. 31, No. 11-16, May 17, 1999, pp. 1431-1451.
(Continued)

*Primary Examiner* — Annan Q Shang
(74) *Attorney, Agent, or Firm* — Invention Mine LLC

(57) ABSTRACT

Various aspects of methods and apparatuses are described herein. Some methods may include receiving video content, receiving metadata including a hierarchical order of metadata fields, and performing an enhancement operation on at least a portion of the video content according to settings associated with at least one of the metadata fields. The enhancement operation may include a video processing operation configured to modify one or more visual characteristics of the video content. The settings associated with the metadata field(s) may be predefined in a device that
(Continued)

receives the video content and the metadata. The enhancement operation may be performed at a time based on a time code in the video content. The enhancement operation may be performed on a bounded area of an object. The hierarchical order may correspond to a type of display technology. The hierarchical order may correspond to information associated with a manufacturer of a display.

18 Claims, 10 Drawing Sheets

(51) Int. Cl.
| | | |
|---|---|---|
| H04N 21/235 | (2011.01) | |
| H04N 21/485 | (2011.01) | |
| H04N 21/845 | (2011.01) | |
| H04N 21/63 | (2011.01) | |
| H04N 21/2343 | (2011.01) | |

(52) U.S. Cl.
CPC . *H04N 21/234318* (2013.01); *H04N 21/4854* (2013.01); *H04N 21/631* (2013.01); *H04N 21/8453* (2013.01)

(58) Field of Classification Search
USPC .................. 725/114–116, 131–134, 139–142
See application file for complete search history.

(56) References Cited

U.S. PATENT DOCUMENTS

| | | | | | |
|---|---|---|---|---|---|
| 7,036,106 | B1* | 4/2006 | Wang | .................. | G06F 9/30145 716/104 |
| 7,658,087 | B1* | 2/2010 | McMurray | ............... | D04B 1/24 66/196 |
| 8,151,305 | B2* | 4/2012 | Doerr | .................... | H04L 65/607 725/133 |
| 8,863,165 | B2* | 10/2014 | Gordon | ............... | H04N 21/254 725/116 |
| 8,891,934 | B2* | 11/2014 | Messmer | ............. | G11B 27/031 348/461 |
| 8,898,705 | B2* | 11/2014 | Melnychenko | ...... | H04N 21/482 725/115 |
| 8,984,577 | B2* | 3/2015 | Baldwin | .......... | H04N 21/25891 709/231 |
| 9,418,031 | B2* | 8/2016 | Aldrey | .................... | G06F 13/38 |
| 10,462,108 | B1* | 10/2019 | Hacker | ................. | H04L 63/123 |
| 2003/0048851 | A1* | 3/2003 | Hwang | ................. | H04L 1/0057 375/240.26 |
| 2004/0031062 | A1 | 2/2004 | Lemmons | | |
| 2007/0028161 | A1* | 2/2007 | Haugh | .................. | G06F 17/211 715/210 |
| 2007/0091881 | A1* | 4/2007 | Kallio | .................. | H04N 21/235 370/389 |
| 2007/0268406 | A1 | 11/2007 | Bennett | | |
| 2008/0059908 | A1* | 3/2008 | Arvilommi | .......... | G06F 3/0482 715/841 |
| 2008/0208751 | A1* | 8/2008 | Sparrell | .................... | H04N 7/16 705/51 |
| 2009/0028189 | A1* | 1/2009 | Kato | ....................... | G10L 19/24 370/476 |
| 2009/0150808 | A1* | 6/2009 | Aldrey | ...................... | G06F 3/01 715/764 |
| 2009/0213270 | A1 | 8/2009 | Ismert et al. | | |
| 2010/0128145 | A1* | 5/2010 | Pitts | ..................... | H04N 13/207 348/231.99 |
| 2010/0315555 | A1* | 12/2010 | Sakurai | .................... | H04N 5/21 348/563 |
| 2011/0080522 | A1 | 4/2011 | Hardacker et al. | | |
| 2011/0289121 | A1* | 11/2011 | Pirkner | ............. | G06F 17/30864 707/805 |
| 2012/0007900 | A1* | 1/2012 | Murai | .................. | G09G 3/3413 345/690 |
| 2012/0038782 | A1* | 2/2012 | Messmer | ............. | H04N 19/467 348/207.1 |
| 2012/0140120 | A1* | 6/2012 | Pratt | ........................ | H04N 9/73 348/617 |
| 2012/0188452 | A1* | 7/2012 | Keiser | .................... | G06T 13/00 348/559 |
| 2013/0283330 | A1* | 10/2013 | Hengeveld | ............. | H04N 7/181 725/116 |
| 2014/0129942 | A1* | 5/2014 | Rathod | ............ | H04N 21/44222 715/720 |
| 2014/0151882 | A1* | 6/2014 | Morimoto | ........... | H01L 27/0688 257/739 |
| 2014/0314256 | A1* | 10/2014 | Fincham | .................. | H04S 7/302 381/303 |
| 2014/0337388 | A1* | 11/2014 | Hacker | ..................... | G06F 9/46 707/802 |
| 2014/0371889 | A1* | 12/2014 | Donaldson | .............. | G06F 3/165 700/94 |
| 2015/0026718 | A1* | 1/2015 | Seyller | ............... | H04N 21/4725 725/34 |
| 2015/0255076 | A1* | 9/2015 | Fejzo | .................... | G10L 19/008 704/500 |
| 2016/0150294 | A1* | 5/2016 | Phatak | ............. | H04N 21/23424 725/23 |
| 2016/0336040 | A1* | 11/2016 | Long | .................... | G11B 27/031 |
| 2017/0134639 | A1* | 5/2017 | Pitts | ................... | H04N 5/23212 |

OTHER PUBLICATIONS

Akyol et al., "Content-Aware Scalability-Type Selection for Rate Adaptation of Scalable Video", EURASIP Journal on Advances in Signal Processing, vol. 2007, Article ID 10236, Nov. 2007, pp. 1-11.

* cited by examiner

ENHANCING VIDEO CONTENT ACCORDING TO METADATA

REFERENCE TO RELATED APPLICATIONS

This application claims the benefit, under 35 U.S.C. § 365 of International Application PCT/US2015/028594, filed Apr. 30, 2015, which was published in accordance with PCT Article 21(2) on Jan. 14, 2016, in English, and which claims the benefit of U.S. patent application No. 62/021,685, filed on Jul. 7, 2014.

TECHNICAL FIELD

The present disclosure, generally, relates to video content and, more specifically, relates to enhancing video content according to metadata.

BACKGROUND

In conventional systems, devices that display video content may receive various inputs from the user to adjust settings associated with the display of the video content. For example, the user may adjust settings of the device such that the brightness of the displayed video content is increased. As another example, the user may adjust settings of the device such that the contrast of the displayed video content is decreased. These settings typically affect all of the displayed video content and persist until these settings are changed by the user. These settings typically do not to affect a particular portion of the video content. In conventional systems, modifications to the displayed video content may be performed at a server that transmits the video content. For example, the server may embed those modifications into the video content and subsequently transmit that modified video content to the receiving device for display. However, embedding such modifications into the video content can substantially increase the data size of the transmitted video content. Additionally, not every receiving device is configured to properly decode, process, and display every modification embedded in the video content. Conventional systems can benefit from enhancements that overcome such limitations to provide an improved user experience.

SUMMARY

Various aspects of methods and apparatuses are described throughout the present disclosure. The following description provides various non-limiting examples and is not intended to limit the scope of the present disclosure. In an aspect, the present disclosure provides a method that includes receiving video content, receiving metadata including a hierarchical order of metadata fields, and performing an enhancement operation on at least a portion of the video content according to settings associated with at least one of the metadata fields. In another aspect, the present disclosure provides an apparatus that includes a memory and at least one processor communicatively coupled to the memory. The at least one processor is configured to receive video content, receive metadata including a hierarchical order of metadata fields, and perform an enhancement operation on at least a portion of the video content according to settings associated with at least one of the metadata fields.

In yet another aspect, the present disclosure provides a method that includes transmitting video content and transmitting metadata including a hierarchical order of metadata fields, wherein an enhancement operation is operable on at least a portion of the video content according to settings associated with at least one of the metadata fields. In a further aspect, the present disclosure provides an apparatus that includes a memory and at least one processor communicatively coupled to the memory. The at least one processor is configured to transmit video content and transmit metadata including a hierarchical order of metadata fields, wherein an enhancement operation is operable on at least a portion of the video content according to settings associated with at least one of the metadata fields.

The foregoing is merely a summary of various features described in greater detail herein. Additional features are also described herein. The embodiments described herein may be implemented in any combination or sub-combination, even if not explicitly described herein. These and other aspects of the present disclosure will become more fully understood upon a review of the detailed description, which follows. Other aspects, features, and embodiments of the present disclosure will become apparent to those of ordinary skill in the art, upon reviewing the following description of specific, exemplary embodiments of the present disclosure in conjunction with the accompanying figures.

DESCRIPTION OF SOME EMBODIMENTS

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Figure 1:
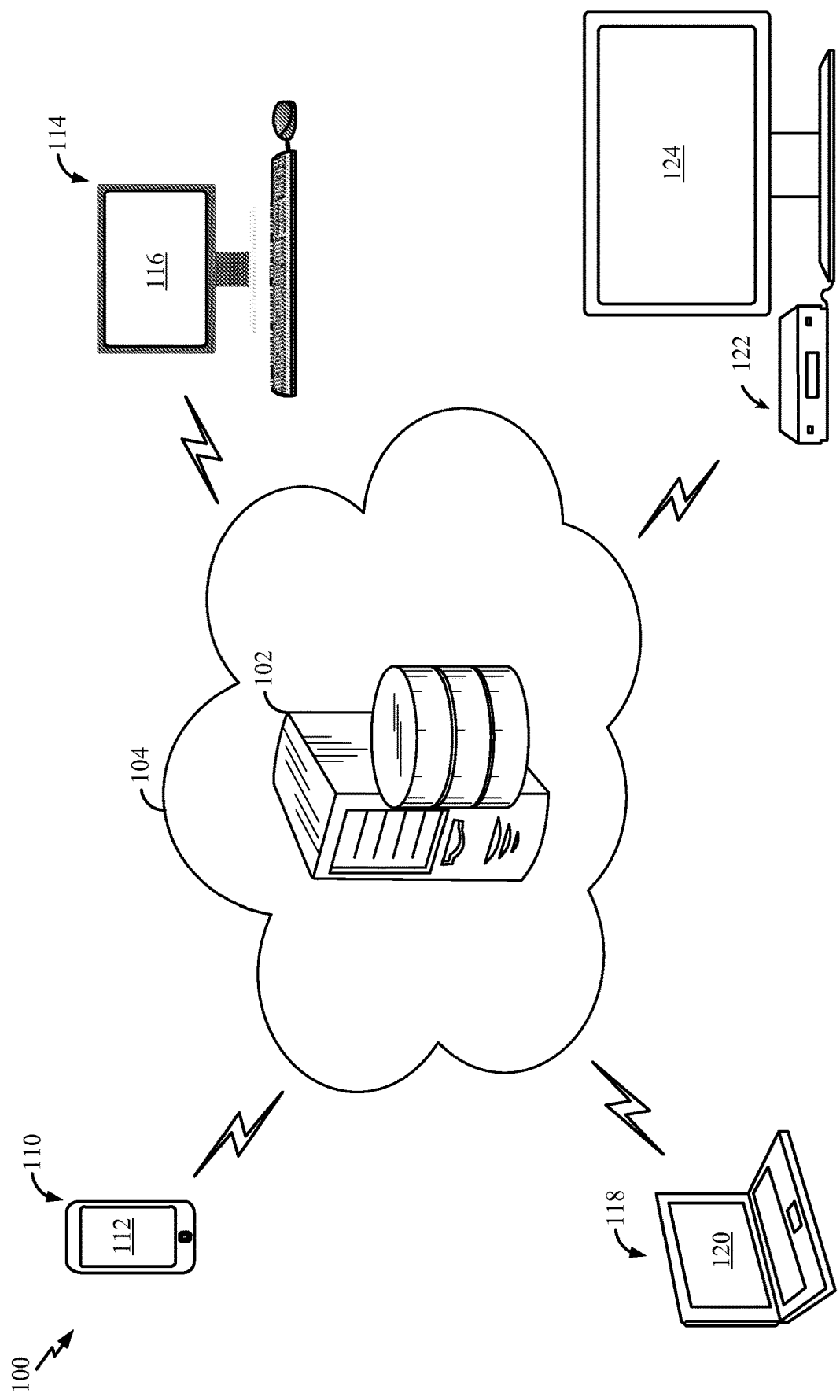
FIG. 1 is a diagram illustrating an example of devices in communication with a server according to various aspects of the present disclosure.

FIG. 1 is a diagram 100 illustrating an example of devices 110, 114, 118, 122 in communication with a server 102 according to various aspects of the present disclosure. For illustrative purposes, a device 110 may be a smartphone, another device 114 may be a desktop computer, yet another device 118 may be a laptop computer, and a further device 122 may be a set top box. Each of the devices 110, 114, 118, 122 may respectively be communicatively coupled to a display 112, 116, 120, 124. The displays 112, 116, 120, 124 may be configured to display various information. Although the non-limiting example illustrated in FIG. 1 shows four devices 110, 114, 118, 122, one of ordinary skill in the art will also understand that any number of devices may be implemented without deviating from the scope of the present disclosure.

The server 102 may be located locally (e.g., within the same network and/or physical location) or remotely (e.g., within a different network and/or physical location) in relation to the devices 110, 114, 118, 122. For example, the server 102 may be associated with an Internet-based (e.g., "cloud"-based) computing environment 104. Communications between the devices 110, 114, 118, 122 and the server 102 may be performed via a wired connection and/or a wireless connection. Such communications may be performed using various types of technologies. One of ordinary skill in the art will understand that various types of communication technologies may be used without deviating from the scope of the present disclosure. Without deviating from the scope of the present disclosure, such communications may be facilitated by various other computers, servers, gateways, routers, and other hardware devices, even if not illustrated in FIG. 1.

Figure 2:
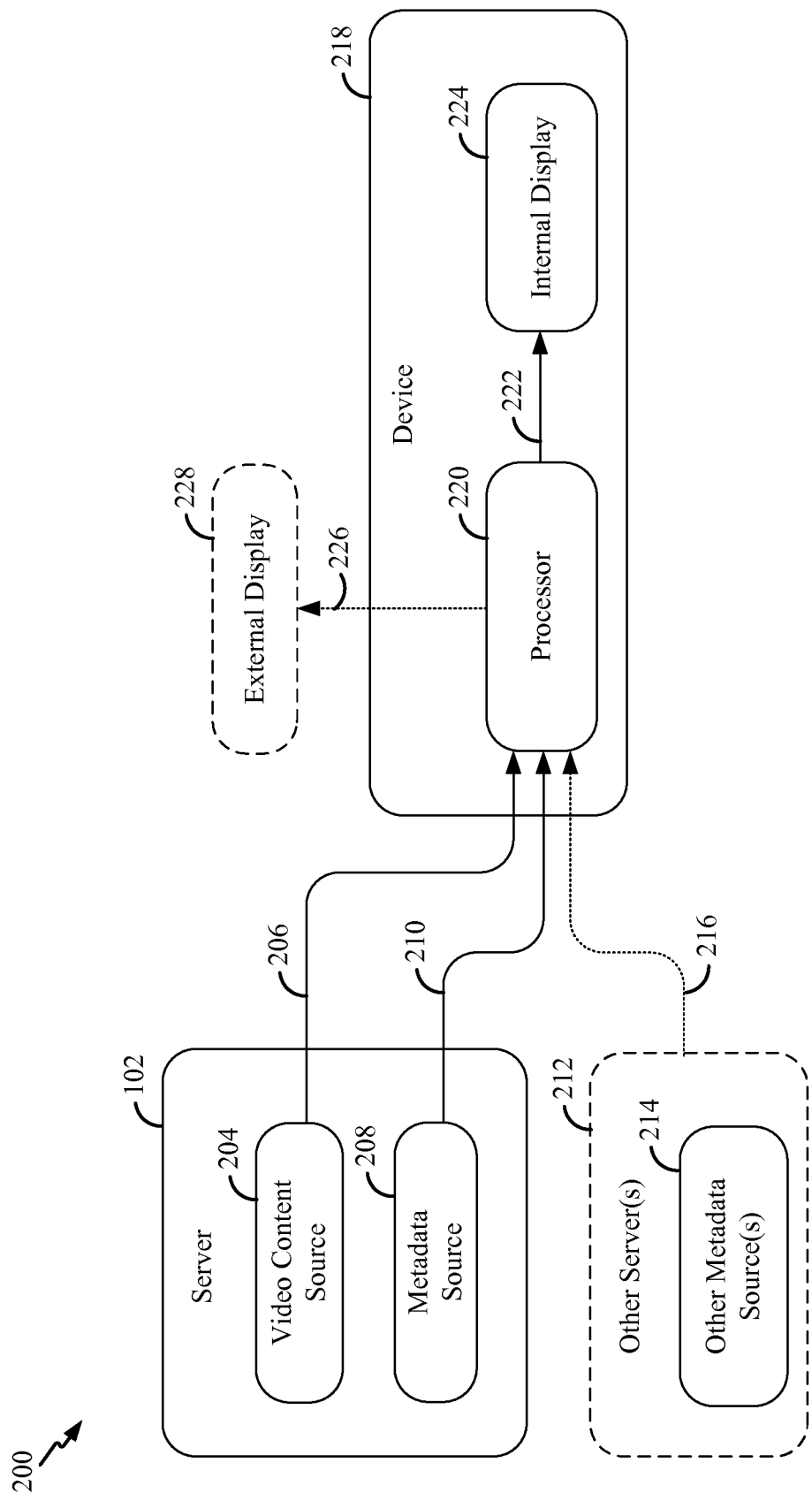
FIG. 2 is a diagram illustrating an example of data flows according to various aspects of the present disclosure.

FIG. 2 is a diagram 200 illustrating an example of various data flows according to various aspects of the present disclosure. The server 102, as described above, may include a video content source 204 and a metadata source 208. The video content source 204 may be configured to store video content. The term 'video content' as used herein may refer to any data that has characteristics known to one of ordinary skill in the art as video, video streams, video clips, moving images, motion pictures, and/or other suitable types of media. Video content may include various characteristics, such as a genre, various scenes, various subjects, various objects, various special attributes, and many other characteristics, which are described in greater detail below. The term 'metadata' as used herein may refer to any data that provides information about or more aspects of other data. Various types of metadata exist and are within the scope of the present disclosure. For example, metadata may include structural metadata (which pertains to the design and specification of data structures), descriptive metadata (which pertains to individual instances of application data or data content), and/or any other suitable types of metadata. The metadata may be configured to provide various types of information without deviating from the scope of the present disclosure. For example, the metadata may be configured to provide information pertaining to various aspects of the video content. Such aspects of the video content may include a genre, a subject, a scene, an object, a special attribute, and various other aspects of the video content. Information included in the metadata may be arranged in various configurations without deviating from the scope of the present disclosure. For example, the information may be configured in a hierarchical order of metadata fields, as described in greater detail below.

The server 102 may transmit video content 206 from the video content source 204 to a processor 220 of a device 218. One of ordinary skill in the art will understand that the device 218 described with reference to FIG. 2 may be the same as or different from any of the devices 110, 114, 118, 122 described above with reference to FIG. 1 without deviating from the scope of the present disclosure. In some configurations, the server 102 may also transmit metadata 210 from the metadata source 208 to the processor 220 of the device 218. In some other configurations, metadata may be transmitted to the processor 220 from one or more other servers. For example, one or more other servers 212 may transmit metadata 216 from their respective metadata source(s) 214 to the processor 220 of the device 218. The metadata may be transmitted to the processor 220 in various embodiments without deviating from the scope of the present disclosure. For example, the metadata may be transmitted in transport packets used to transit video information, packet headers, packet payloads, fields of the packets, parts of video/audio/metadata interleaved packets, data streams separate from video streams, part of an area on a storage medium, as a broadcast stream, from a resource available through a networking device, as encrypted data or an encrypted file, and suitable variations thereof.

The processor 220 may be a video processor, a video decoder, or any other suitable type of processing system. The processor 220 may perform various operations without deviating from the scope of the present disclosure. In some configurations, the processor 220 may receive the video content 206 and the metadata 210, 216 and perform various enhancement operations (EOs) on at least a portion of the video content 206. Such EOs may be performed according to settings associated with a portion of the metadata 210, 216. For example, the processor 220 may perform an EO on at least a portion of the video content 206 according to settings associated with at least one of the metadata fields. The settings indicating the EO(s) to be performed by the processor 220 for each specific field of metadata may be contained in a table, or any other suitable means of mapping metadata fields to the EO(s). Such a table may be stored in a memory component of the device 218, pre-configured or pre-defined in the processor 220, transmitted to the device 218 from another source, and/or retrieved from another device via the Internet or other communication network.

An EO may include any operation that modifies one or more visual characteristics of any portion of the video content 206. For example, various EOs may modify any one or more of the following visual characteristics of any portion of the video content 206: color, sharpness, blocking/deblocking, detail enhancements, textures, brightness, film grain addition, mosquito noise reduction, motion compensation, up-scaling, down-scaling, frame rate, luminance, chrominance, block size, bit depth, motion vectors, noise reduction parameters, motion estimation, quantization levels, color information for high dynamic range, and other suitable visual characteristics of video content. Although various non-limiting examples of an EO are provided herein, one of ordinary skill in the art will understand that such examples shall not limit the scope of the present disclosure and that additional and alternative embodiments of an EO exist and are within the scope of the present disclosure. In some configurations, the processor 220 may perform such an EO automatically in response to analyzing the received video content. In some other configurations, the processor 220 may perform such an EO in response to one or more external commands and/or one or more pre-set criteria, which may be provided by a user.

After the EO is performed by the processor 220 of the device 218, the enhanced video content may be transmitted from the processor 220 to a user display. In some configurations, the processor 220 may transmit the enhanced video content 222 to an internal display 224, such as a display that is integrated into the device 218. For example, referring to FIG. 1, the enhanced video content may be shown on the display 112 of the device 110. In some other configurations, the enhanced video content 226 may be transmitted from the processor 220 to an external display 228, such as a display that is communicatively coupled to the device 218. For example, referring to FIG. 1, the enhanced video content may be shown on the display 124 communicatively coupled to the device 122.

As illustrated in FIG. 2 and described throughout the present disclosure, the EO is performed at the device 218 rather than at the server 102. Such aspects of the present disclosure provide various advantages over conventional systems. In conventional systems, modifications to the displayed video content may be performed at a server that transmits the video content. Such a server may embed those modifications into the video content and subsequently transmit that modified video content to the receiving device. However, embedding such modifications into the video content can substantially increase the data size of the transmitted video content. In other words, conventional systems can require increased transmission capabilities (e.g., bandwidth) to transmit the modified video content. Additionally, not every receiving device is configured to properly decode, process, and display every modification embedded in the video content. In such circumstances, the user is unable to experience the modified video content and the modification embedded in the video content does not improve the user experience.

The present disclosure provides various advantages over conventional systems. Firstly, according to various aspects of the present disclosure, the video content is enhanced at the device 218 rather than at the server 102, which does not require the data size of the transmitted video content to be substantially increased relative to conventional systems. As such, the metadata does not require a substantial increase in transmission capability (e.g., bandwidth) relative to conventional systems. Secondly, according to various aspects of the present disclosure, the video content is enhanced according to compatible and supported enhancement operations at the device 218. Accordingly, the enhancement to the video content is well-suited for that particular device 218. Thirdly, the metadata fields included in the metadata 210, 216 may be arranged in various hierarchical orders according to certain aspects of the display (e.g., display technology, etc.), as described in greater detail below. The foregoing are a few non-limiting examples of advantages of the present disclosure over conventional systems, and one of ordinary skill in the art will readily appreciate various other advantages.

Figure 3:
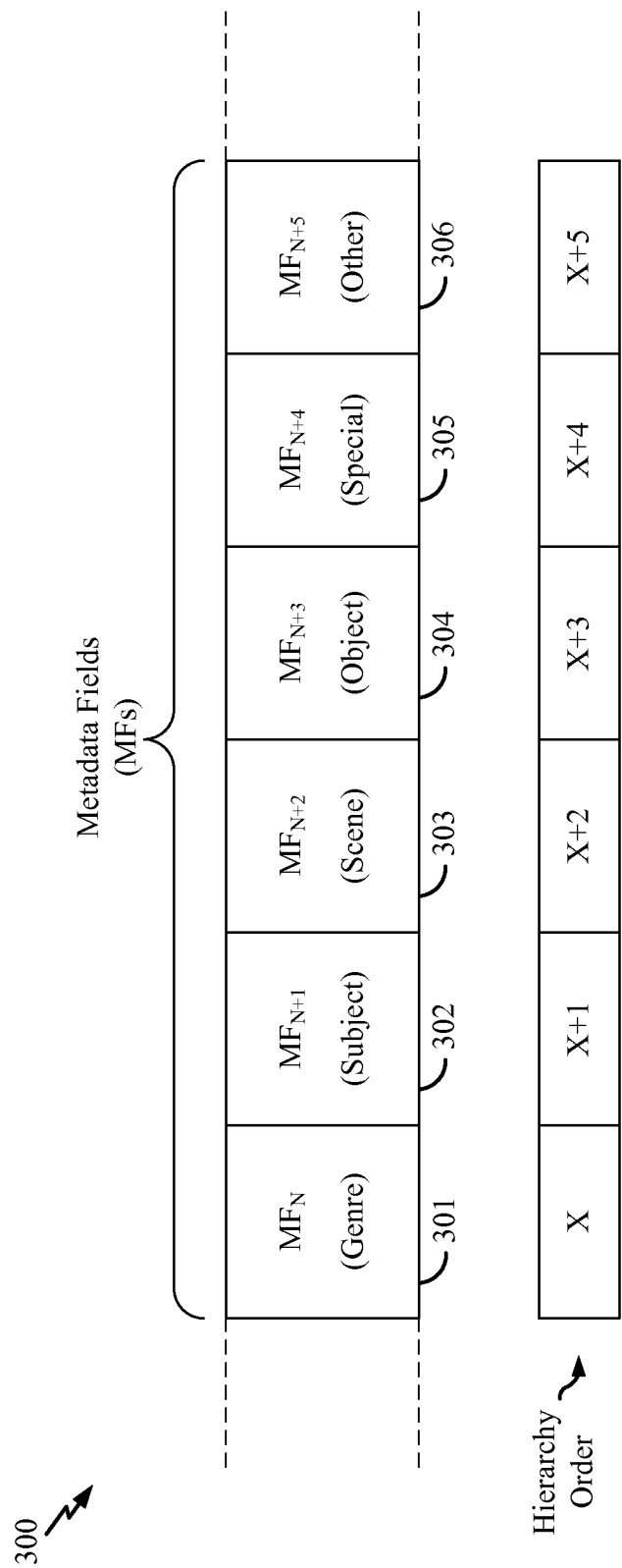
FIG. 3 is a diagram illustrating an example of metadata fields according to various aspects of the present disclosure.

FIG. 3 is a diagram 300 illustrating an example of metadata fields (MFs). For example, the MFs may include $MF_N$ 301, $MF_{N+1}$ 302, $MF_{N+2}$ 303, $MF_{N+3}$ 304, $MF_{N+4}$ 305, and $MF_{N+5}$ 306. Although the examples described herein with reference to FIG. 3 indicate a certain number of MFs (e.g., six MFs), one of ordinary skill in the art will understand that the metadata (as described above) may include any number of MFs without deviating from the scope of the present disclosure. Each MF may be associated with a particular characteristic corresponding to the video content. $MF_N$ 301 may be associated with a particular genre corresponding to the video content. Generally, 'genre' refers to the overall characterization of the video content. Non-limiting examples of genres include adventure, action, romance, comedy, honor, science fiction, fantasy fiction, documentary, drama, etc. $MF_{N+1}$ 302 may be associated with a particular subject corresponding to the video content. Generally, 'subject' refers to the characterization of the subject matter to which the video content pertains. Non-limiting examples of subject include war, oceanography, ancient civilizations, aeronautics, etc. $MF_{N+2}$ 303 may be associated with a particular scene corresponding to the video content. Generally, 'scene' refers to the characterization of a particular portion of the video content. The scene may be delineated by a time segment during which that scene is shown. The scene may be bounded by a particular period of time (e.g., a start time and an end time). The video content may include a time code that indicates a bounded period of time. $MF_{N+3}$ 304 may be associated with a particular object corresponding to the video content. Generally, 'object' refers to a particular item included in the video content. The object may be bounded by three or more points of the displayed video content. The object may be symmetrical or irregular in shape without deviating from the scope of the present disclosure. $MF_{N+4}$ 305 may be associated with a special attribute corresponding to the video content. Non-limiting examples of the special attribute include parental controls, information about the age-appropriateness of the video content, closed captions, etc. $MF_{N+5}$ 306 may be associated with various other attributes corresponding to the video content. Such other attributes may include any data that corresponds to any aspect of the video content.

A hierarchical order may exist among any two or more of the MFs. Generally, the term(s) 'hierarchical order' and/or 'hierarchy' can refer to the sequence, arrangement, priority, organization, grouping, ranking, and/or arrangement of the MFs 301-306 of the metadata. For example, $MF_N$ 301 may have a hierarchy value of X, $MF_{N+1}$ 302 may have a hierarchy value of X+1, $MF_{N+2}$ 303 may have a hierarchy value of X+2, $MF_{N+3}$ 304 may have a hierarchy value of X+3, $MF_{N+4}$ 305 may have a hierarchy value of X+4, and $MF_{N+5}$ 306 may have a hierarchy value of X+5. In other words, $MF_{N+5}$ 306 may be higher in the hierarchy than $MF_{N+4}$ 305, which may be higher in the hierarchy than $MF_{N+3}$ 304, which may be higher in the hierarchy than $MF_{N+2}$ 303, which may be higher in the hierarchy than $MF_{N+1}$ 302, which may be higher in the hierarchy than $MF_N$ 301. One of ordinary skill in the art will understand that the hierarchical order illustrated in FIG. 3 is a non-limiting example and alternative configurations for the hierarchical order of the MFs 301-306 are within the scope of the present disclosure.

In some configurations, the hierarchical order of the MFs 301-306 may correspond to a type of display technology used for displaying the video content. For example, referring to FIG. 1, the display 124 of the set top box 122 may have different display technology than the display 112 of the smartphone 110. Accordingly, the hierarchical order of the MFs 301-306 may be different when the metadata is received by the set top box 122 relative to the hierarchical order of the MFs 301-306 when the metadata is received by the smartphone 110.

In some configurations, the hierarchical order of the MFs 301-306 may correspond to information associated with the manufacturer of the display used for displaying the video content. For example, referring to FIG. 1, the display 116 of the desktop computer 114 may be a manufacturer that is different from the manufacturer of the display 120 of the laptop computer 118. As such, information corresponding to the manufacturer of the display 116 of the desktop computer 114 may be different from information corresponding to the manufacturer of the display 120 of the laptop computer 118. Accordingly, the hierarchical order of the MFs 301-306 may be different when the metadata is received by the desktop computer 114 relative to the hierarchical order of the MFs 301-306 when the metadata is received by the laptop computer 118.

In some configurations, the hierarchical order of the MFs 301-306 may correspond to information associated with a colorist of the video content. A colorist may refer to an individual, company, organization, computer software, or other entity that is involved in the creation of video content and that may add color to any portion of that video content. For example, a first colorist may have been involved with the creation of a first segment of the video content, and a second colorist (different from the first colorist) may have been involved in the creation of a second segment (different from the first segment) of the video segment. Accordingly, the hierarchical order of the MFs 301-306 may be different for the first segment relative to the hierarchical order of the MFs 301-306 for the second segment.

Figure 4:
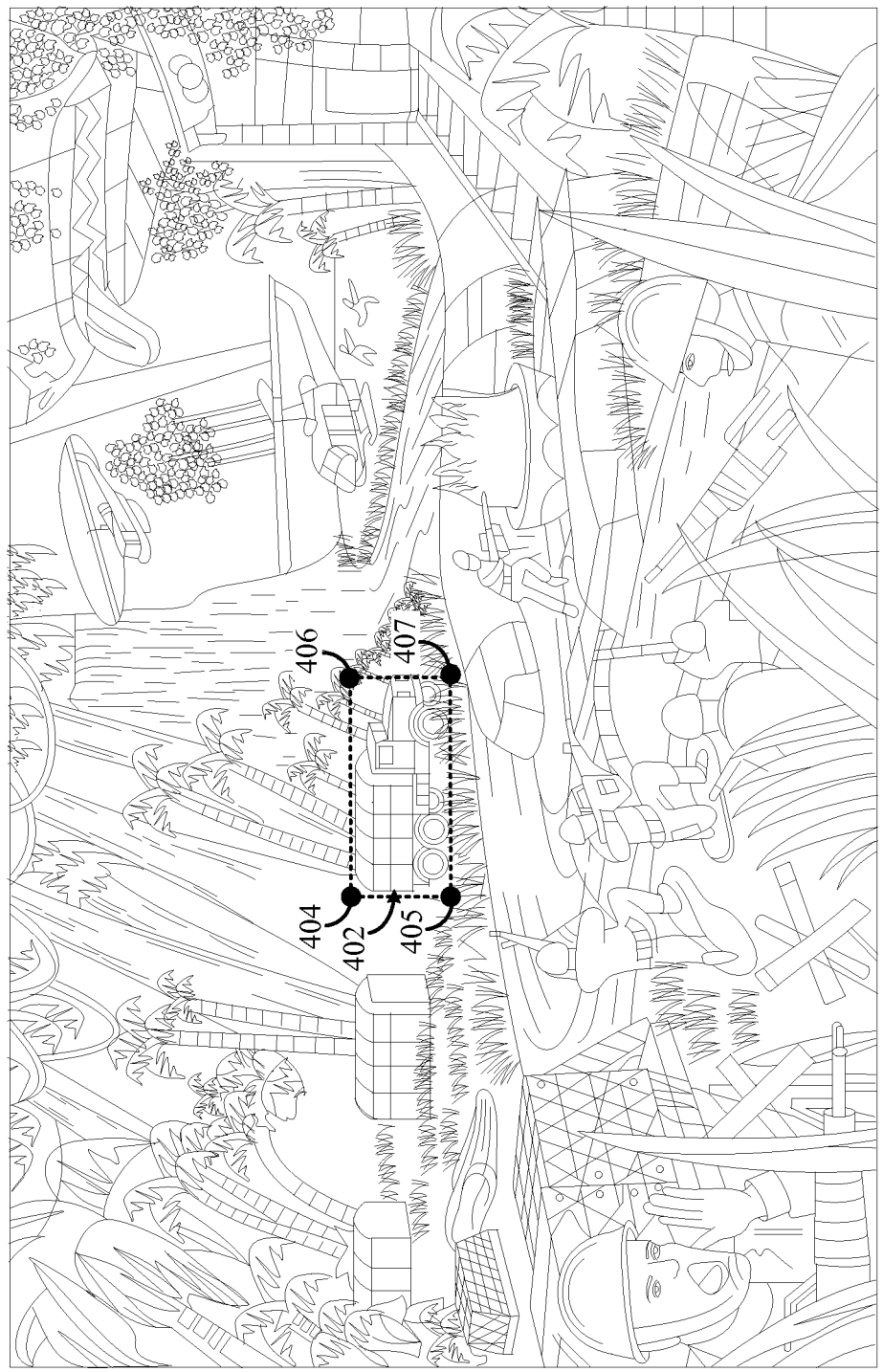
FIG. 4 is a diagram illustrating an example of a portion of the video content in relation to various enhancement operations according to various aspects of the present disclosure.

FIG. 4 is a diagram 400 illustrating an example of a portion of the video content in relation to various EOs. When the MFs 301-306 are received by the processor 220, the processor 220 may read the information included in the MFs 301-306 and perform one or more EOs on any portion of the video content according to setting associated with at least one of the MFs 301-306. For example, the processor 220 may detect that the $MF_N$ (genre) 301 indicates an 'action' genre. The processor 220 may be configured to perform the EO of 'increase sharpness' for video content that has a genre of 'action.' Accordingly, after reading the $MF_N$ (genre) 301, which indicates a genre of 'action,' the processor 220 may perform the EO of 'increase sharpness' for the video content according to setting associated with the metadata field (e.g., $MF_N$ (genre) 301).

The processor 220 may also read information included in one or more of the other MFs 302-306 and perform various EOs on any portion of the video content according to respective settings associated with those MFs 302-306. For example, $MF_{N+1}$ (subject) 302 may indicate a subject of 'war.' The processor 220 may be configured to perform the EO of 'increase brightness' for video content that has a subject of 'war.' Accordingly, after reading the $MF_{N+1}$ (subject) 302, which indicates a subject of 'war,' the processor 220 may perform the EO of 'increase brightness' for the video content according to setting associated with the metadata field (e.g., $MF_{N+1}$ (subject) 302).

In some circumstances, the information included in two or more MFs 301-306 do not conflict with each other. That is, in some circumstances, the EOs performed according to the settings associated with the various MFs 301-306 are not mutually exclusive. As an example, the $MF_{N+2}$ (scene) 303 may include information associated with a scene bounded between time $T_X$ and time $T_{X+Y}$. Upon reading this information, the processor 220 may be configured to perform the EO of 'increase contrast' during the time period between time $T_X$ and time $T_{X+Y}$. Because 'increase contrast' does not conflict with any of the other EOs mentioned above (e.g., 'increase sharpness,' increase brightness'), then the processor 220 can proceed with performing the EO of 'increase contrast' during the time period between time $T_X$ and time $T_{X+Y}$ according to setting associated with the metadata field (e.g., $MF_{N+2}$ (scene) 303).

However, in some other circumstances, the information included in two or more MFs 301-306 may conflict with each other. That is, in some circumstances, the EOs performed according to the settings associated with the various MFs 301-306 are mutually exclusive. As an example, the $MF_{N+3}$ (object) 304 may include information associated with an object bounded by three or more points. As illustrated in FIG. 4, an example of such an object may be a truck 402, which is bounded by the four points 404-407 surrounding that truck 402. In some configurations, the processor 220 may be configured to perform object-recognition, which may facilitate in identifying such objects in the video content. Upon reading the information included in $MF_{N+3}$ (object) 304, the processor 220 may consider performing the EO of 'reduce contrast' for the object (e.g., the truck 402) bounded by those points. Because 'reduce contrast' conflicts with at least one of the EO mentioned above (e.g., 'increase contrast'), then the processor 220 must determine which of those EOs to perform. In such circumstances, the processor 220 determines that a first metadata field (e.g., $MF_{N+3}$ (object) 304, which has a hierarchy value of X+3) is higher in the hierarchical order relative to a second metadata field (e.g., $MF_{N+2}$ (scene) 303, which has a hierarchy value of X+2). Accordingly, the processor 220 performs the EO of 'reduce contrast' on the corresponding portion of the video content (e.g., the object, which is the truck 402) according to settings associated with the first metadata field (e.g., $MF_{N+3}$ (object) 304) rather than the EO of 'increase contrast' according to setting associated with the second metadata field (e.g., $MF_{N+2}$ (scene) 303).

The non-limiting examples described above describe a processor 220 that performs a single EO in association with each of the MFs 301-306. However, the processor 220 may perform more than one EO in association with any of the MFs 301-306 without deviating from the scope of the present disclosure. For instance, in some configurations, the processor 220 may be configured to perform 'reduce contrast' as well as 'increase brightening' upon receiving the information included in the $MF_{N+3}$ (object) 304. The foregoing is an example wherein two EOs have the same priority relative to each other. However, in some other examples, two or more EOs may have different priorities relative to each other. In such examples, the processor 220 determines that a metadata field (e.g., $MF_{N+3}$ (object) 304) is associated with two or more EOs and, prior to performing any EO, selects at least one of the two (or more) EOs based on a priority of the two (or more) EOs. For example, if the EO of 'increase brightening' has a higher priority than the priority of the EO of 'reduce contrast,' then the processor 220 may select to initially perform the EO of 'increase brightening' before performing the EO of 'reduce contrast.'

Figure 5:
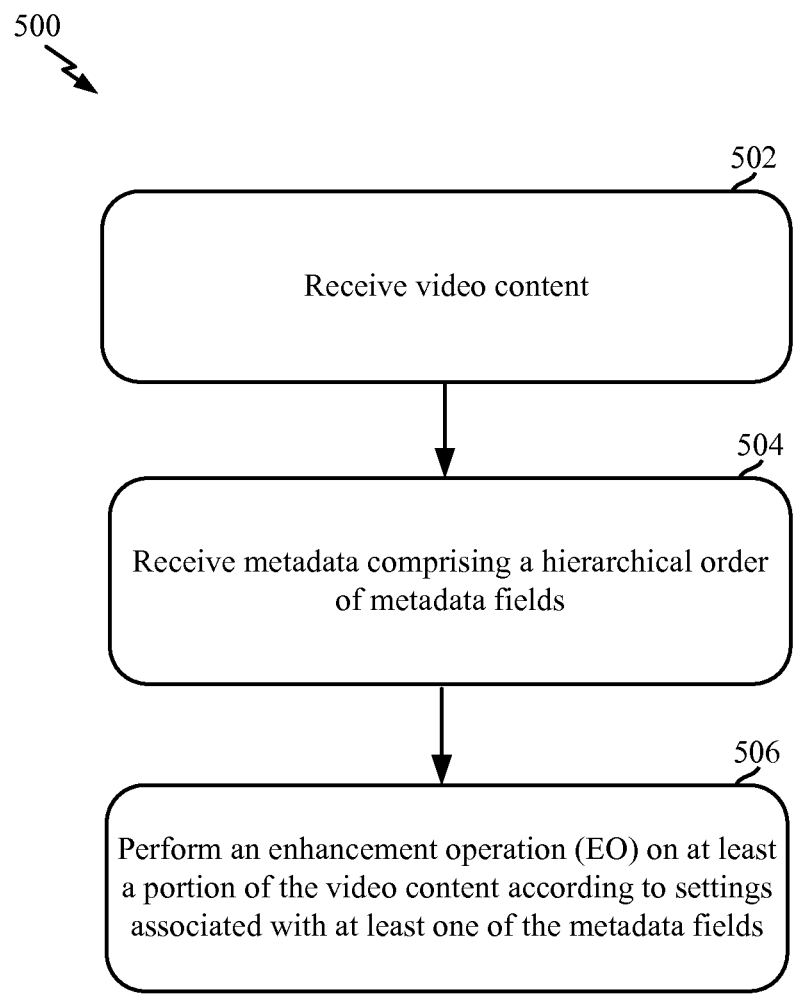
FIGS. 5-7 are flowcharts illustrating examples of methods and/or processes performed by a device according to various aspects of the present disclosure.

FIG. 5 is a diagram 500 illustrating an example of methods and/or processes according to various aspects of the present disclosure. Such methods and/or processes may be performed by a device (e.g., the device 218 described above). At block 502, the device receives video content. The term 'video content' as used herein may refer to any data that has characteristics known to one of ordinary skill in the art as video, video streams, video clips, moving images, motion pictures, and other suitable types of media. Video content may include various characteristics, such as a genre, various scenes, various subjects, various objects, various special attributes, and many other characteristics, as described above.

At block 504, the device receives metadata comprising a hierarchical order of metadata fields. The term 'metadata' as used herein may refer to any data that provides information about or more aspects of other data. For example, the metadata may be configured to provide information pertaining to various aspects of the video content. Such aspects of the video content may include a genre, a subject, a scene, an object, a special attribute, and various other aspects, as described in greater detail below. Information included in the metadata may be arranged in various configurations without deviating from the scope of the present disclosure.

At block 506, the device performs an EO on at least a portion of the video content according to settings associated with at least one of the metadata fields. A hierarchical order may exist among any two or more of the MFs. Generally, the term 'hierarchical order' and/or 'hierarchy' can refer to the sequence, arrangement, priority, organization, grouping, ranking, and/or arrangement of the MFs 301-306 of the metadata. For example, referring to FIG. 3, $MF_N$ (genre) 301 may have a hierarchy value of X, $MF_{N+1}$ (subject) 302 may have a hierarchy value of X+1, $MF_{N+2}$ (scene) 303 may have a hierarchy value of X+2, $MF_{N+3}$ (object) 304 may have a hierarchy value of X+3, $MF_{N+4}$ (special) 305 may have a hierarchy value of X+4, and $MF_{N+5}$ (other) 306 may have a hierarchy value of X+5. When the MFs 301-306 are received by the processor 220, the processor 220 may read the information included in the MFs 301-306 and perform one or more EOs on any portion of the video content according to setting associated with at least one of the MFs 301-306. For example, the processor 220 may detect that the $MF_N$ 301 indicates an 'action' genre. The processor 220 may be configured to perform the EO of 'increase sharpness' for video content that has a genre of 'action.' Accordingly, after reading the $MF_N$ 301, which indicates a genre of 'action,' the processor 220 may perform the EO of 'increase sharpness' for the video content according to setting associated with the metadata field (e.g., $MF_N$ (genre) 301).

Figure 6:
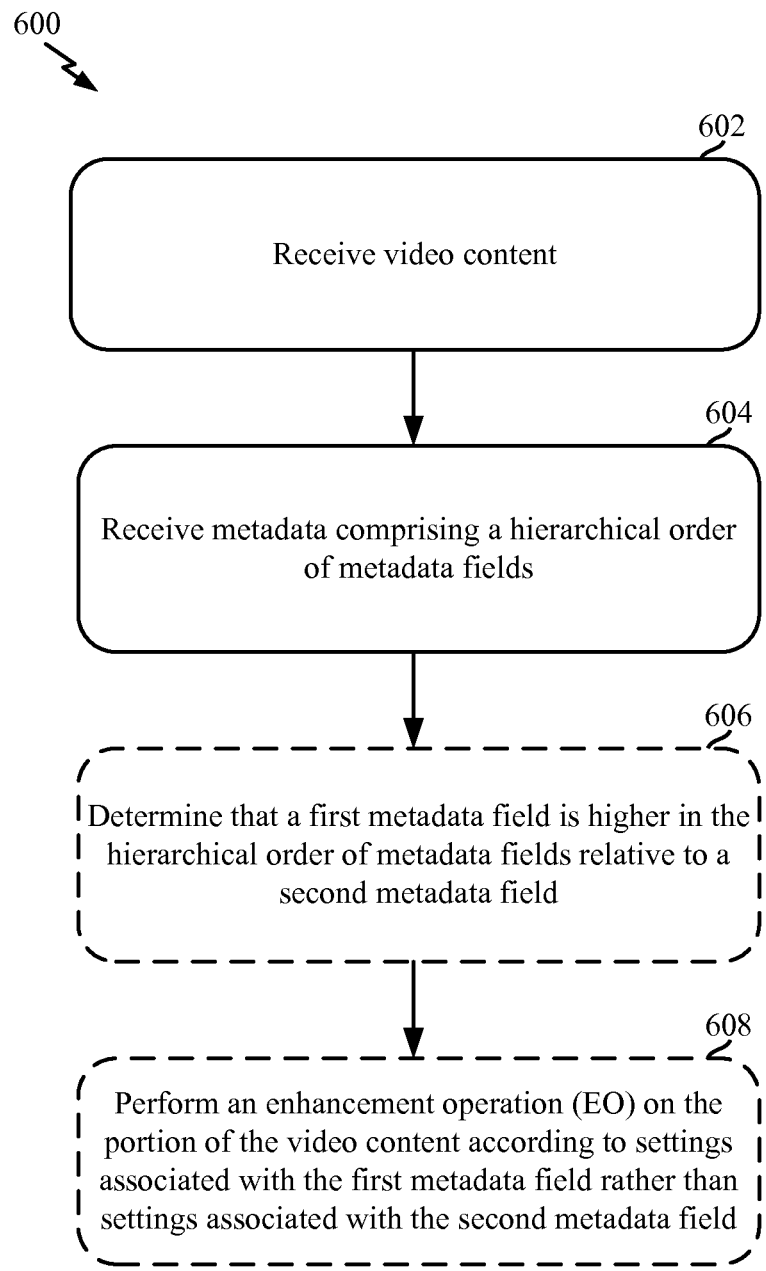

FIG. 6 is a diagram 600 illustrating an example of various methods and/or processes according to various aspects of the present disclosure. Such methods and/or processes may be performed by a device (e.g., the device 218 described above). At block 602, the device receives video content. At block 604, the device receives metadata comprising a hierarchical order of metadata fields. Various aspects pertaining to blocks 602, 604 are described above and therefore will not be repeated. In some configurations, at block 606, the device determines that a first metadata field is higher in the hierarchical order relative to a second metadata field. For example, referring to FIG. 3, the device may determine that a first metadata field (e.g., $MF_{N+3}$ (object) 304, which has a hierarchy value of X+3) is higher in the hierarchical order relative to a second metadata field (e.g., $MF_{N+2}$ (scene) 303, which has a hierarchy value of X+2).

At block 608, the device may perform the EO on the portion of the video content according to settings associated with the first metadata field rather than settings associated with the second metadata field. Again referring to FIG. 3, the device may perform the EO of 'reduce contrast' on the corresponding portion of the video content (e.g., the object, which is the truck 402) according to settings associated with the first metadata field (e.g., $MF_{N+3}$ (object) 304) rather than the EO of 'increase contrast' according to setting associated with the second metadata field (e.g., $MF_{N+2}$ (scene) 303).

Figure 7:
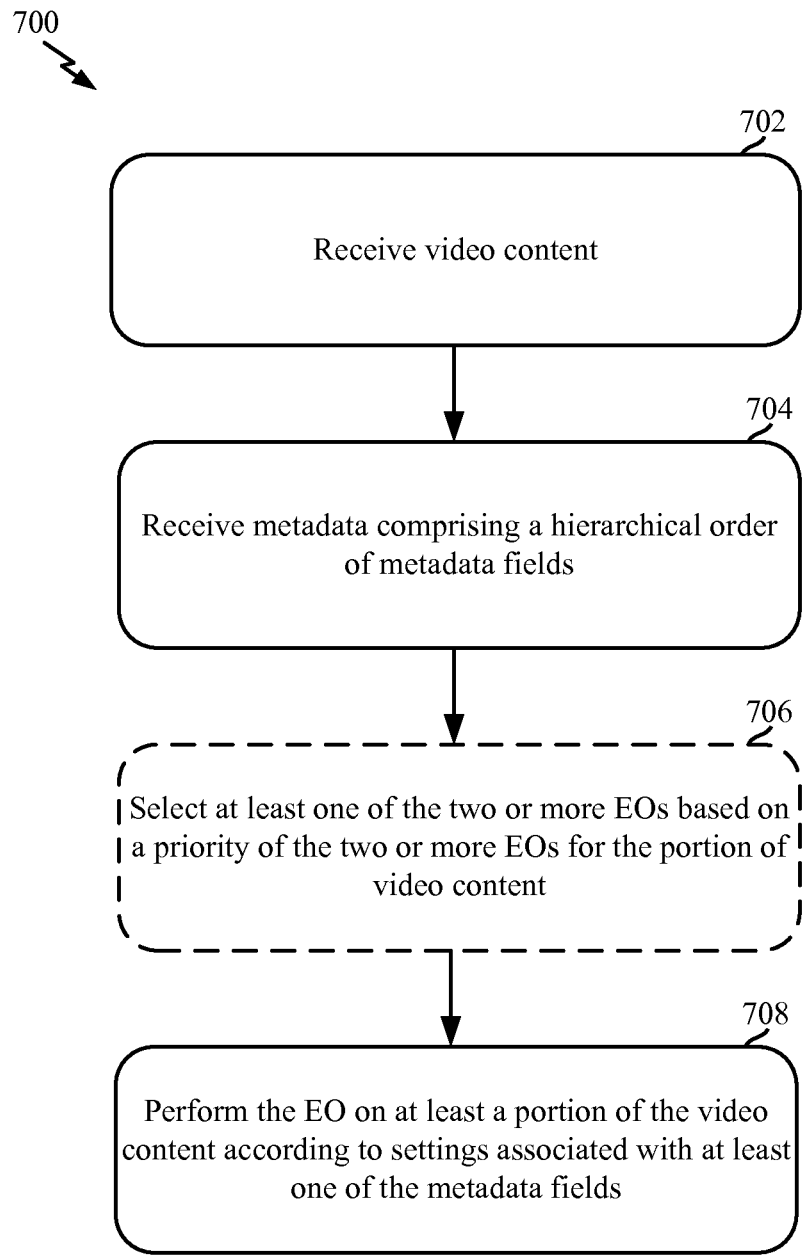

FIG. 7 is a diagram 700 illustrating an example of various methods and/or processes according to various aspects of the present disclosure. Such methods and/or processes may be performed by a device (e.g., the device 218 described above). At block 702, the device receives video content. At block 704, the device receives metadata comprising a hierarchical order of metadata fields. Various aspects pertaining to blocks 702, 704 are described above and therefore will not be repeated. In some configurations, a metadata field may be associated with two or more EOs and those two or more EOs may have different priorities relative to each other. For example, a particular metadata field may be associated with the EO of 'increase brightening' as well as the EO of 'reduce contrast.' If the EO of 'increase brightening' has a higher priority than the priority of the EO of 'reduce contrast,' then the device selects to perform the EO of 'increase brightening' before performing the EO of 'reduce contrast.' Accordingly, at block 708, the device performs the EO of 'increase brightening' on the video content according to setting associated with the metadata field.

Figure 8:
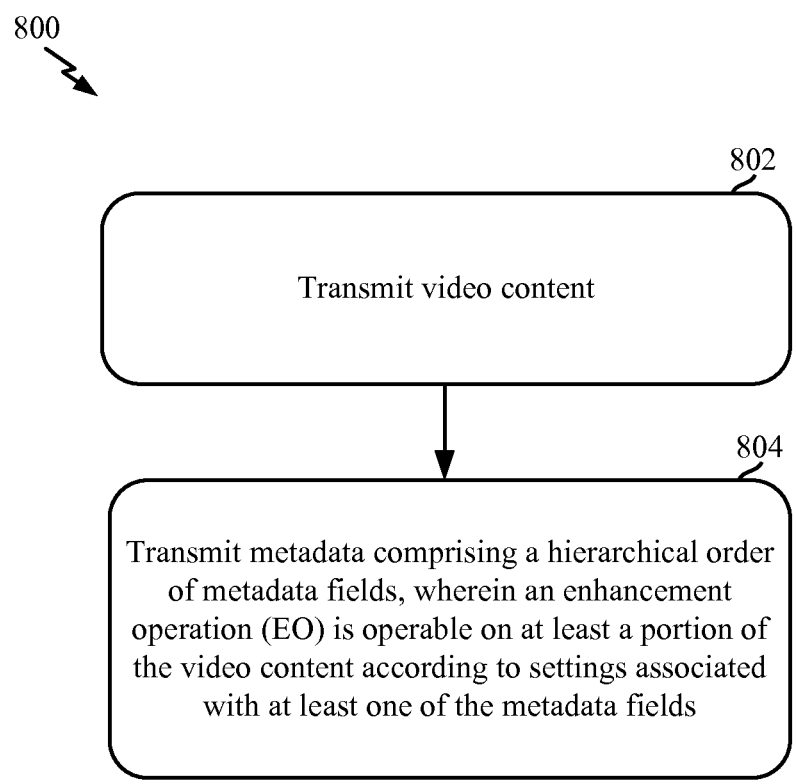
FIG. 8 is a flowchart illustrating an example of methods and/or processes performed by a server according to various aspects of the present disclosure.

FIG. 8 is a diagram 800 illustrating an example of various methods and/or processes according to various aspects of the present disclosure. Such methods and/or processes may be performed by a server (e.g., the device 218 described above). At block 802, the server may transmit video content. At block 804, the server may transmit metadata comprising a hierarchical order of metadata fields. An EO may be operable on at least a portion of the video content according to settings associated with at least one of the metadata fields. Various aspects pertaining to blocks 802, 804 are described further above and therefore will not be repeated.

The methods and/or processes described with reference to FIGS. 5-8 are provided for illustrative purposes and are not intended to limit the scope of the present disclosure. The methods and/or processes described with reference to FIGS. 5-8 may be performed in sequences different from those illustrated therein without deviating from the scope of the present disclosure. Additionally, some or all of the methods and/or processes described with reference to FIGS. 5-8 may be performed individually and/or together without deviating from the scope of the present disclosure. It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

Figure 9:
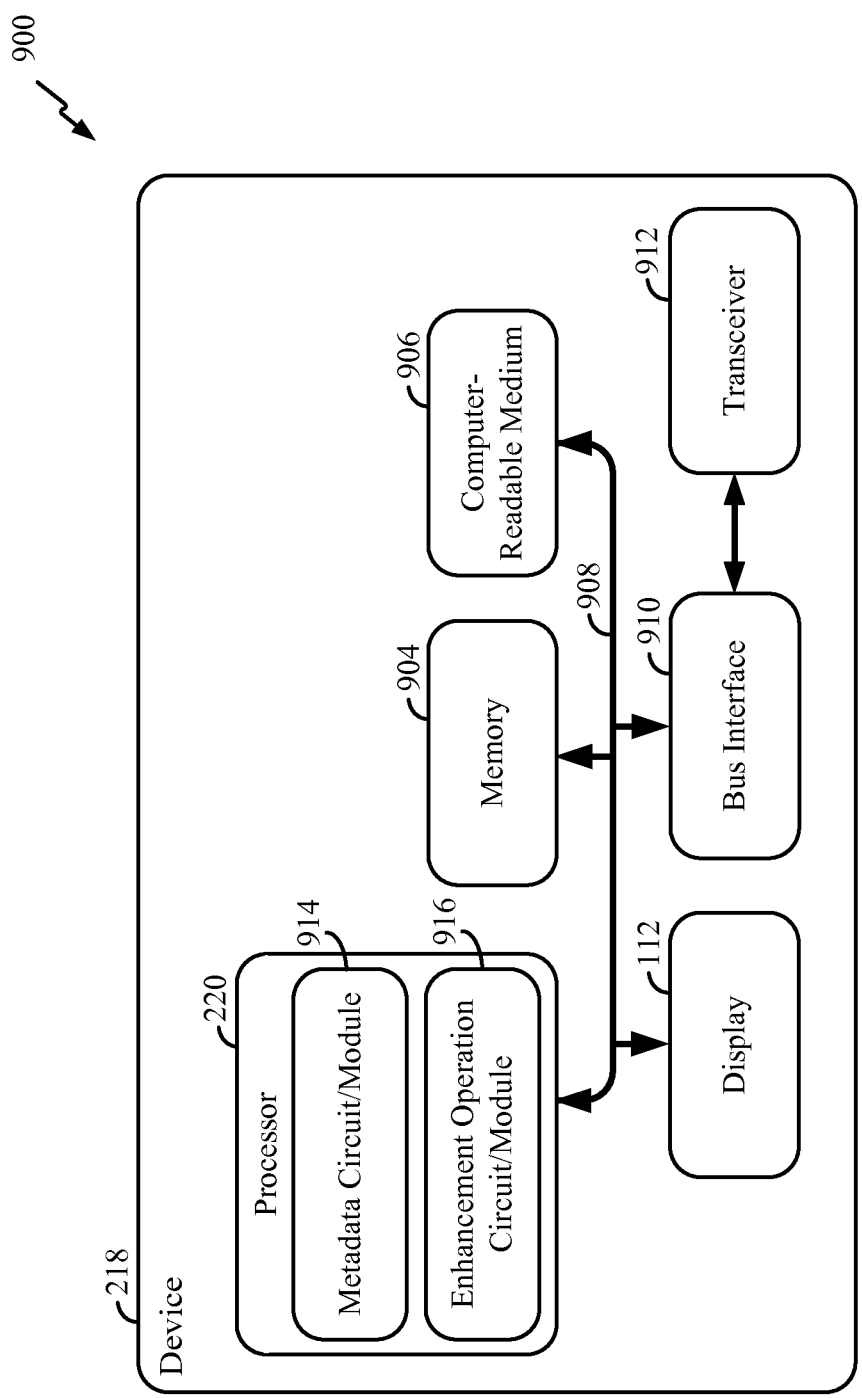
FIG. 9 is a diagram illustrating an example of a hardware implementation of a device according to various aspects of the present disclosure.

FIG. 9 is a diagram 900 illustrating an example of a hardware implementation of the device 218. The device 218 may include a transceiver 912. The transceiver 912 may be configured to receive data and/or transmit data in communication with another apparatus. The transceiver 912 provides a means for communicating with another apparatus and/or device, such as the server 102. The transceiver 912 may be configured to perform such communication using various types of technologies. One of ordinary skill in the art will understand that many types of technologies to perform such communication may be used without deviating from the scope of the present disclosure. The device 218 may also include a memory 904, one or more processors 220, a computer-readable medium 906, a display 112, and a bus interface 910. The bus interface 910 may provide an interface between a bus 908 and the transceiver 912. The memory 904, the one or more processors 220, the computer-readable medium 906, the display 112, and the bus interface 910 may be connected together via the bus 908. The bus 908 may also link various other circuits such as timing sources, peripherals, voltage regulators, and/or power management circuits. The processor 220 may be communicatively coupled to the transceiver 912 and/or the memory 904.

One of ordinary skill in the art will understand that the processor 220 may include various other circuits that are configured for and provide the means for performing any one or more of the functions, methods, processes, features and/or aspects described herein. In some configurations, the processor 220 may include a metadata circuit/module 914. The metadata circuit/module 914 may include various circuits, software modules, and/or hardware modules configured to receive metadata comprising a hierarchical order of metadata fields and perform any one or more of the functions, methods, processes, features and/or aspects described herein with regard to metadata and/or metadata fields. In some configurations, the processor 220 may include an enhancement operation circuit/module 916. The enhancement operation circuit/module 916 may include various circuits, software modules, and/or hardware modules configured to perform at least one enhancement operation on at least a portion of the video content according to settings associated with at least one metadata field.

The computer-readable medium 906 may include various instructions. The instructions may include computer-executable code configured to perform various functions and/or enable various aspects described herein. The computer-executable code may be executed by various hardware components (e.g., the processor 220) of the device 218. The instructions may be a part of various software programs and/or software modules. One of ordinary skill in the art will understand that the computer-readable medium 906 may also include various instructions that include computer-executable code configured for performing any one or more of the functions, methods, processes, features and/or aspects described herein. The memory 904 may include various memory modules. The memory modules may be configured to store, and have read therefrom, various values and/or information by the processor 220. The memory modules may also be configured to store, and have read therefrom, various values and/or information upon execution of the computer-executable code included in the computer-readable medium 906. One of ordinary skill in the art will also understand that the memory 904 may be configured for storing information therein, and reading information therefrom, with respect to any of the features, functions, methods, processes, and/or aspects described herein.

One of ordinary skill in the art will also understand that the device 218 may include alternative and/or additional elements without deviating from the scope of the present disclosure. In accordance with various aspects of the present disclosure, an element, or any portion of an element, or any combination of elements may be implemented with a processing system that includes one or more processors 220. Examples of the one or more processors 220 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on the computer-readable medium 906. The computer-readable medium 906 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 906 may also include, by way of example, a carrier wave, a transmission line, and any other suitable medium for transmitting software and/or instructions that may be accessed and read by a computer. The computer-readable medium 906 may be embodied in a computer program product. By way of example and not limitation, a computer program product may include a computer-readable medium in packaging materials. Those skilled in the art will recognize how best to implement the described functionality presented throughout this disclosure depending on the particular application and the overall design constraints imposed on the overall system.

Figure 10:
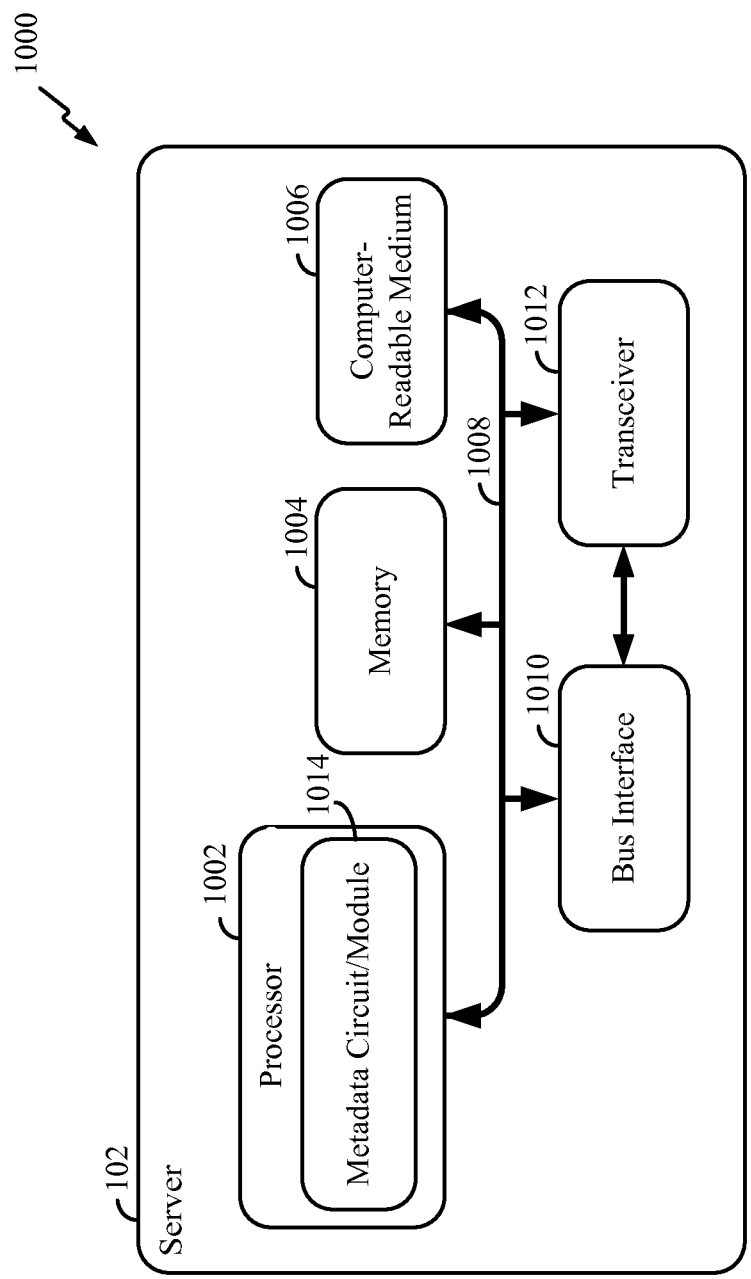
FIG. 10 is a diagram illustrating an example of a hardware implementation of a server according to various aspects of the present disclosure.

FIG. 10 is a diagram 1000 illustrating an example of a hardware implementation of the server 102. The server 102 may include a transceiver 1012. The transceiver 1012 may be configured to receive data and/or transmit data in communication with another apparatus. The transceiver 1012 provides a means for communicating with another apparatus and/or device, such as the device 218. The transceiver 1012 may be configured to perform such communication using various types of technologies. One of ordinary skill in the art will understand that many types of technologies to perform such communication may be used without deviating from the scope of the present disclosure. The server 102 may also include a memory 1004, one or more processors 1002, a computer-readable medium 1006, and a bus interface 1010. The bus interface 1010 may provide an interface between a bus 1008 and the transceiver 1012. The memory 1004, the one or more processors 1002, the computer-readable medium 1006, and the bus interface 1010 may be connected together via the bus 1008. The bus 1008 may also link various other circuits such as timing sources, peripherals, voltage regulators, and/or power management circuits. The processor 1002 may be communicatively coupled to the transceiver 1012 and/or the memory 1004.

One of ordinary skill in the art will understand that the processor 1002 may include various other circuits that are configured for and provide the means for performing any one or more of the functions, methods, processes, features and/or aspects described herein. In some configurations, the processor 1002 may include a metadata circuit/module 1014. The metadata circuit/module 1014 may include various circuits, software modules, and/or hardware modules configured to generating and/or transmit metadata comprising a hierarchical order of metadata fields. The metadata circuit/module 1014 may include various circuits, software modules, and/or hardware modules configured to perform any one or more of the functions, methods, processes, features and/or aspects described herein with regard to metadata and/or metadata fields.

The computer-readable medium 1006 may include various instructions. The instructions may include computer-executable code configured to perform various functions and/or enable various aspects described herein. The computer-executable code may be executed by various hardware components (e.g., the processor 1002) of the server 102. The instructions may be a part of various software programs and/or software modules. One of ordinary skill in the art will understand that the computer-readable medium 1006 may also include various instructions that include computer-executable code configured for performing any one or more of the functions, methods, processes, features and/or aspects described herein. The memory 1004 may include various memory modules. The memory modules may be configured to store, and have read therefrom, various values and/or information by the processor 1002. The memory modules may also be configured to store, and have read therefrom, various values and/or information upon execution of the computer-executable code included in the computer-readable medium 1006. One of ordinary skill in the art will also understand that the memory 1004 may be configured for storing information therein, and reading information therefrom, with respect to any of the features, functions, methods, processes, and/or aspects described herein.

One of ordinary skill in the art will also understand that the server 102 may include alternative and/or additional elements without deviating from the scope of the present disclosure. In accordance with various aspects of the present disclosure, an element, or any portion of an element, or any combination of elements may be implemented with a processing system that includes one or more processors 1002. Examples of the one or more processors 1002 include microprocessors, microcontrollers, DSPs, FPGAs, PLDs, state machines, gated logic, discrete hardware circuits, and other suitable hardware configured to perform the various functionality described throughout this disclosure. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on the computer-readable medium 1006. The computer-readable medium 1006 may be a non-transitory computer-readable medium. A non-transitory computer-readable medium includes, by way of example, a magnetic storage device (e.g., hard disk, floppy disk, magnetic strip), an optical disk (e.g., a CD or a DVD), a smart card, a flash memory device (e.g., a card, a stick, or a key drive), a RAM, a ROM, a PROM, an EPROM, an EEPROM, a register, a removable disk, and any other suitable medium for storing software and/or instructions that may be accessed and read by a computer. The computer-readable medium 1006 may also include, by way of example, a carrier wave, a transmission line, and any other suitable medium for transmitting software and/or instructions that may be accessed and read by a computer. The computer-readable medium 1006 may be embodied in a computer program product. By way of example and not limitation, a computer program product may include a computer-readable medium in packaging materials. Those skilled in the art will recognize how best to implement the described functionality presented throughout this disclosure depending on the particular application and the overall design constraints imposed on the overall system.

The foregoing description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." All structural and functional equivalents to the elements of the various aspects described throughout this disclosure that are known or later come to be known to those of ordinary skill in the art are expressly incorporated herein by reference and are intended to be encompassed by the claims.

What is claimed:

1. A method of data processing, the method comprising:
   receiving video content;
   receiving metadata comprising a hierarchical order of metadata fields including a first metadata field and a second metadata field, the first metadata field higher in the hierarchical order of metadata fields relative to the second metadata field; and
   performing an enhancement operation on at least a portion of the video content according to settings associated with the first metadata field rather than settings associated with the second metadata field in case of conflict between the enhancement operation according to settings associated with the first metadata field and the enhancement operation according to settings associated with the second metadata field.

2. The method of claim 1, wherein at least one metadata field is associated with two or more enhancement operations, the method further comprising:
   selecting at least one of the two or more enhancement operations based on a priority of the two or more enhancement operations for the portion of video content.

3. The method of claim 1, wherein the enhancement operation is performed at a time that is based on a time code in the video content.

4. The method of claim 1, wherein the enhancement operation is performed on a bounded area of an object in the video content.

5. The method of claim 1, wherein the enhancement operation comprises a video processing operation configured to modify one or more visual characteristics of the portion of the video content.

6. The method of claim 1, wherein the hierarchical order of the metadata fields depends on a type of display technology used for displaying the video content.

7. The method of claim 1, wherein the hierarchical order of the metadata fields depends on information associated with a manufacturer of a display used for displaying the video content.

8. The method of claim 1, wherein the hierarchical order of the metadata fields depends on information associated with a colorist of the video content.

9. The method of claim 1, wherein the settings associated with the at least one metadata field are retrieved via a device that receives the video content and the metadata.

10. An apparatus for data processing, the apparatus comprising:
    a memory; and
    at least one processor communicatively coupled to the memory and configured to:
    receive video content;
    receive metadata comprising a hierarchical order of metadata fields; and
    perform an enhancement operation on at least a portion of the video content according to settings associated with the first metadata field rather than settings associated with the second metadata field in case of conflict between the enhancement operation according to settings associated with the first metadata field and the enhancement operation according to settings associated with the second metadata field.

11. The apparatus of claim 10, wherein at least one metadata field is associated with two or more enhancement operations, and wherein the at least one processor is further configured to:
    select at least one of the two or more enhancement operations based on a priority of the two or more enhancement operations for the portion of video content.

12. The apparatus of claim 10, wherein the enhancement operation is performed at a time that is based on a time code in the video content.

13. The apparatus of claim 10, wherein the enhancement operation is performed on a bounded area of an object in the video content.

14. The apparatus of claim 10, wherein the enhancement operation comprises a video processing operation configured to modify one or more visual characteristics of the portion of the video content.

15. The apparatus of claim 10, wherein the hierarchical order of the metadata fields corresponds to a type of display technology used for displaying the video content.

16. The apparatus of claim 10, wherein the hierarchical order of the metadata fields corresponds to information associated with a manufacturer of a display used for displaying the video content.

17. The apparatus of claim 10, wherein the hierarchical order of the metadata fields corresponds to information associated with a colorist of the video content.

18. The apparatus of claim 10, wherein the settings associated with the at least one metadata field are retrieved via a device that receives the video content and the metadata.

* * * * *